United States Patent [19]

Morales

[11] 4,131,507
[45] Dec. 26, 1978

[54] EVAPORATOR

[76] Inventor: Adolfo J. Morales, 6000 Leonardo St., Coral Gables, Fla.

[21] Appl. No.: 768,681

[22] Filed: Feb. 15, 1977

[51] Int. Cl.$^2$ .......................................... B01D 1/00
[52] U.S. Cl. ..................................... 159/23; 159/40; 159/41; 159/24 A; 127/16; 122/158
[58] Field of Search ........................... 159/23, 27–29, 159/38, 40, 41, DIG. 31; 127/16; 122/32, 33, 48, 155–165, 114–125

[56] References Cited

U.S. PATENT DOCUMENTS

| 269,575 | 12/1882 | Hillman | 159/23 |
|---|---|---|---|
| 276,161 | 4/1883 | Cook | 159/40 |
| 1,365,608 | 1/1921 | Trumble | 122/160 |
| 2,906,250 | 9/1959 | Clarkson | 122/165 |

Primary Examiner—Norman Yudkoff
Attorney, Agent, or Firm—Peck & Peck

[57] ABSTRACT

An evaporator which is specifically adapted for the evaporation of sugar cane juices, however, it is a versatile apparatus and may be used with equal facility in various evaporating situations. Instead of using steam as is conventional, the heating medium to produce the required evaporation comprises waste combustion gases. Gas orienting means is included through which the hot waste gases flow to an enclosed area of generally hour glass shape. The entire apparatus is of generally circular configuration and includes a circular evaporating area into which the juices are pumped and are under pressure and in which they are evaporated. The circular evaporating area into which the juices are pumped and where evaporation occurs is in heat transfer relationship with the enclosed area through which the hot waste gases flow. In this evaporation process, a body of juice is pumped into the area in which the evaporation takes place, such evaporation occurring atop and above the liquid juice body and since the body of juice is under pressure the evaporated juice is forced from the evaporating area to a second body or to a condenser.

1 Claim, 3 Drawing Figures

& nbsp;
EVAPORATOR

SUMMARY OF THE INVENTION

This invention relates to an evaporating apparatus which has been specifically adapted for use in the evaporation of cane juices, however, it is to be distinctly understood that it may be utilized in a variety of evaporating situations.

One of the major features and characteristics of my invention resides in the utilization of the heat from waste combustion gases as the dehydrating or evaporating medium. It will be appreciated that this use of such waste combustion gases in an apparatus of this general character is of substantial significance particularly in view of the energy and fuel shortages which are prevalent in this era. It will also be recognized that the use of waste combustion gases from furnaces, and the like, which would otherwise be of no value provides substantial economies in the operation of the evaporator apparatus.

The apparatus generally provides an orienting means through which the hot combustion gases upwardly flow and are properly oriented thereby for flow into an enclosed heat transmitting area from which such waste combustion gases flow upwardly through a chimney and into the atmosphere. It has been my experience in this discipline that excellent evaporating or dehydrating results are obtained when the heat producing generally enclosed area is of substantially hour-glass configuration.

This major portion of the apparatus is of generally circular configuration providing an evaporating or dehydrating pan which girds the heat transmitting area and is so shaped that it is subjected to the heat from the heat producing area in an unusual and efficatious manner. The evaporating pan or area which surrounds the heat transmitting area is formed with two spaced apart walls. The inner of which forms the wall between the evaporating area and the heat transmitting area and, of course, the heat therefrom is transferred to the evaporating area to affect the desired evaporation of the cane juices therein. The inner wall of the evaporating pan or area which separates the pan from the heat transmitting area is preferably, though not necessarily, formed of steel or any other material having excellent heat transfer characteristics.

The lower part of the circular evaporating space, pan or area is fed cane juices under pressure and as this pressured juice flows upwardly in the circular evaporating area, the heat from the heat transmitting area is imparted fully to the juice for the evaporation or dehydration thereof. As this description proceeds, it will become apparent that during the evaporating process a body of dehydrated juice rests upon a lower body of the liquid pressured juice and this body of dehydrated juice is constantly forced upwardly in the pan by the pressured lower body of liquid juice. It will thus be apparent that this is a continuous process and that the liquid juice is constantly forced upwardly in the pan for the dehydration thereof, while at the same time the dehydrated or evaporated juice is forced upwardly and outwardly from the evaporating area to a second body or condenser.

Additional objects and advantages of the present invention will become more readily apparent to those skilled in the art when the following general statements and descriptions are read in the light of the appended drawings.

DETAILED DESCRIPTION

Figure 1:
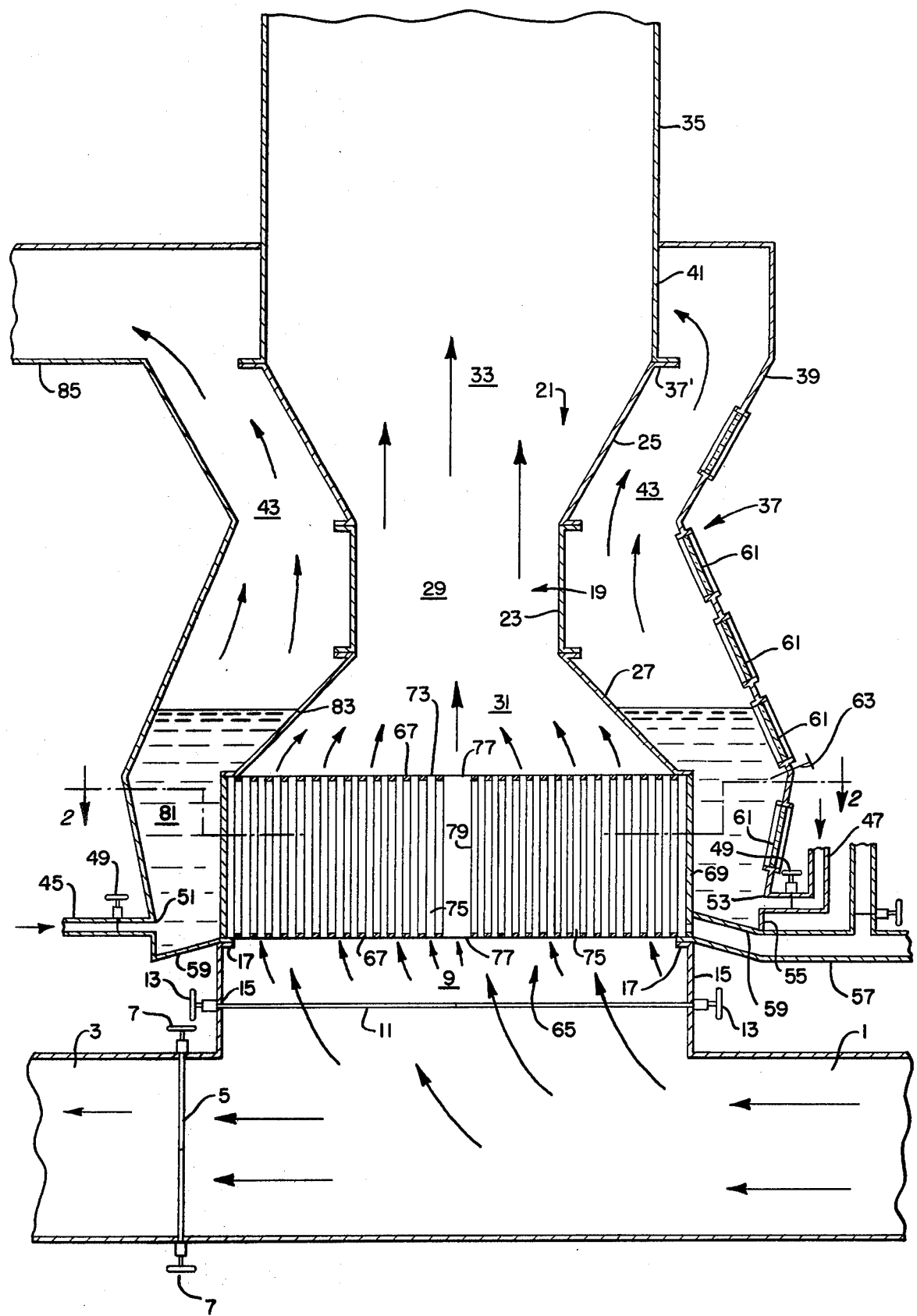
FIG. 1 is a vertical sectional view of the evaporating apparatus.
Figure 2:
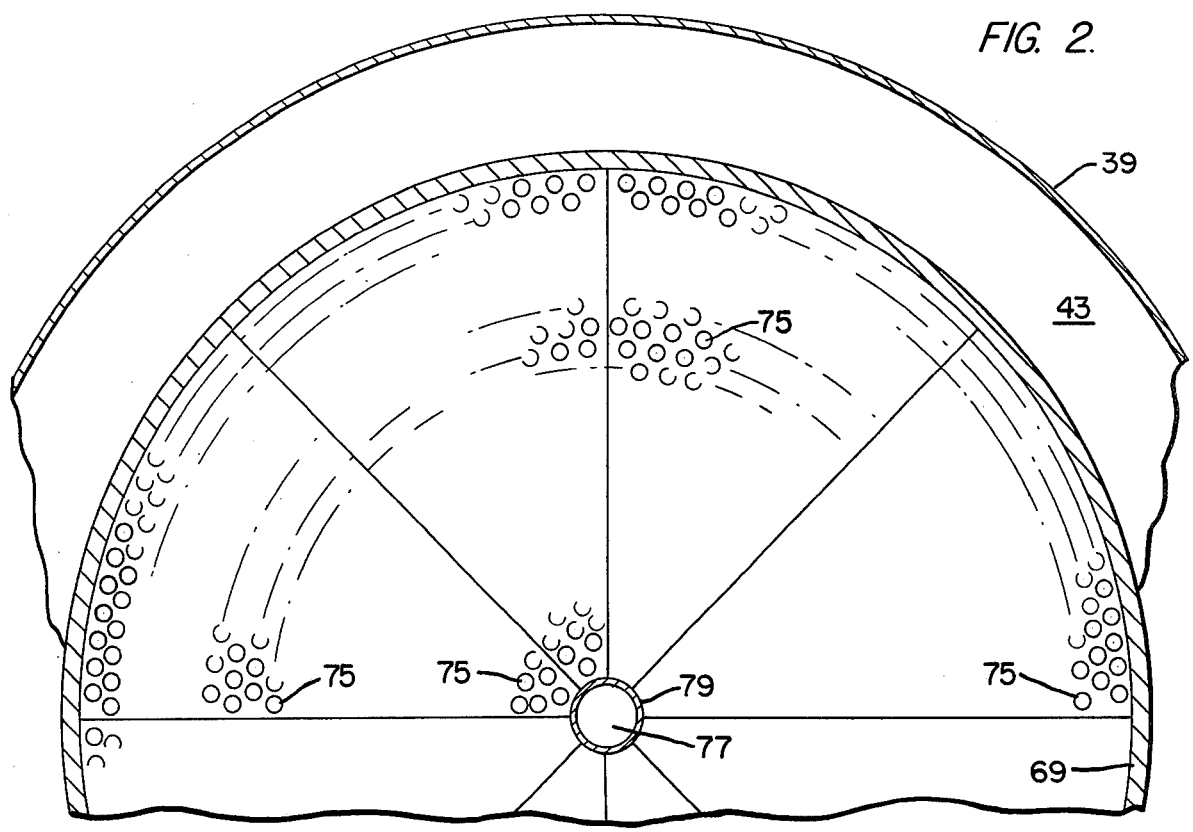
FIG. 2 is a view taken on the line 2—2 of FIG. 1.
Figure 3:
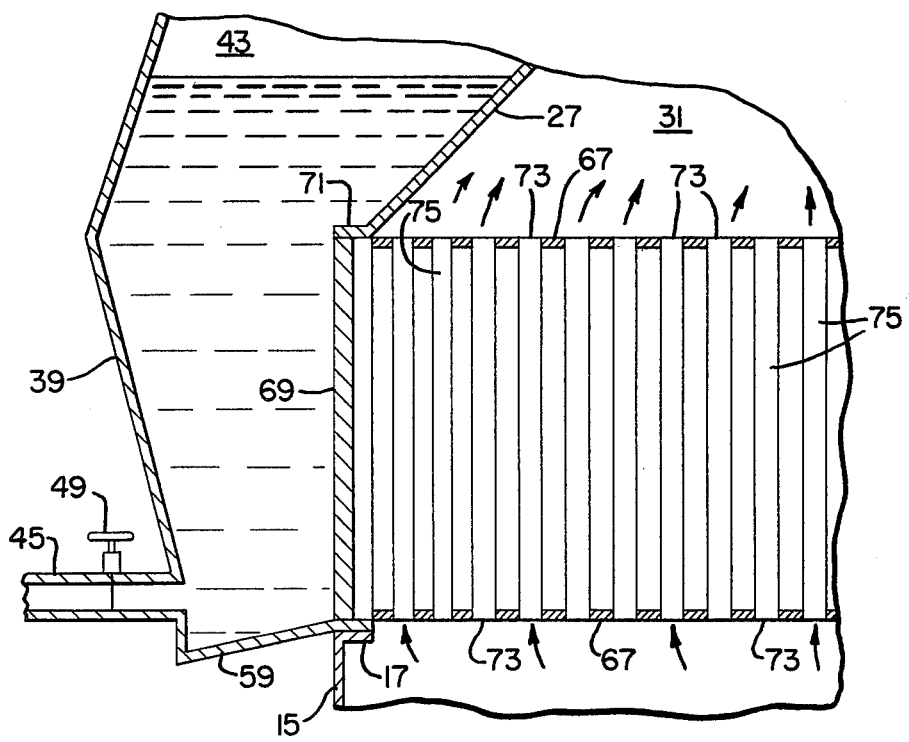
FIG. 3 is a detailed sectional view of a part of the waste combustion gas orienting means and the liquid juice in the bottom part of the evaporating pan.

In the accompanying drawings the numeral 1 has been used to designate the inlet duct through which hot waste combustion gases flow from a furnace or the like and the numeral 3 designates the outlet duct for flow of any of the gases which may not be used or needed in the evaporating process. At the entrance to the outlet duct 3, a half door 5 is provided which is controlled by any suitable type of operating wheels or means 7. The combined ducts 1 and 3 are so formed to provide an outlet opening or egress area 9 in the top thereof for flow of combustion gases to the orienting means for the evaporating process, as will be described in detail. A further half door 11 which is controlled by operating wheels or the like 13 is provided to control the volume of hot waste combustion gases which flow from the duct to the orienting means. The ducts 1 and 3 are fashioned to provide an upstanding annular collar or the like 15 which at its top edge preferably includes a radially inwardly directed flange 17. It will be understood that the annular collar 15 defines the diametrical dimension of the egress area 9 and it will be further understood that by proper operation of the operating wheels 7 the half doors 5 may be adjusted to control the volume of hot waste combustion gases which flow through the egress area 9 and to and through the heat orienting means, as will be described. Also the half door 11 likewise controls the volume of gases flowing to and through the hot waste combustion gas orienting means.

I have used the numeral 19 to designate in its entirety the heat transmitting area which is in heat transfer relationship with the evaporating pan or area, as will be explained. The heat transmitting area is of generally hour-glass configuration and is defined by a circular wall designated generally by the numeral 21, and formed of three sections as will be explained. The circular wall 21 is so shaped that a central portion or section thereof forms a substantially vertically extending portion collar 23. From the upper edge of the collar 23 extends a further section 25 of the circular wall 21 angularly related to the collar 23 so that it flares radially outwardly and upwardly therefrom forming an area of inverted bell shape. From the lower edge of the collar 23 a further section 27 of the circular wall 21 is provided and this section flares radially outwardly and downwardly from the said collar forming a bell shaped area. The walls 25 and 27 may be fixed in any suitable manner to the top and bottom edges, respectively, of the collar 23. The collar or wall 23 and the walls 25 and 27 are formed of steel or any other suitable material having high heat transfer characteristics, for it will be recognized as this description proceeds that these walls 23, 25 and 27 separate the heat transmitting area 19 from the evaporator pan. It will now be understood that the heat transmitting area is of hour-glass configuration providing a diametrically constricted area 29, a lower generally bell shaped area 31 of generally greater diameter than the diameter of the area 29 and an upper area 33 of generally inverted bell shape and of generally greater diameter than the diameter of the area 29. The exit from the heat transmitting area 19 comprises a chimney 35 so that the hot waste combustion gases which have served their purpose may flow into the atmosphere. The chimney 35 which is preferably of circular configuration is fixed as at 37' in any suitable manner to the top edge of the wall 25.

The evaporator pan or dehydrating area has been designated in its entirety by the numeral 37 and this area girds the heat transmitting area 19 and is composed of an outer wall 39 which is spaced from the walls 23, 25 and 27 and also the lower portion of the chimney 35. The shape of the outer wall 39 comforms generally to the shape of the inner walls 25 and 27 and of the lower portion 41 of the chimney 35. It will now be apparent from consideration of the drawings that the evaporating area 43 surrounds and girds the heat transmitting area 19.

Two diametrically opposed feeder pipe lines 45 and 47 are provided and open into the lower area of the evaporating pan or area 43. Each feeder pipe line 45 and 47 is provided with a manually operated valve 49. Juice is pumped into the lower portion of the area 43 and, of course, this juice is under pressure and the flow of juice through these feeder lines may be controlled by the valves 49. The area 43 on the left hand side of FIG. 1 and particularly the exterior wall thereof is supported on the feeder line 45 as at 51. This may be an integral connection or any other mounting arrangement desired. The external wall of the area 43 as illustrated in the right hand view of FIG. 1 is fixed as at 53 to the feeder line 47 and again this connection may be made in any suitable way. A flange 55 extends downwardly from feeder line 47 and is fixed to a pipe line 57 to drain, pass, etc. and a portion of this line is fixed to the flange 17 of the annular collar 15; this particular construction is also illustrated and of general similarity to the arrangement shown at the left in FIG. 1, the bottom of the pan being illustrated at 59. Any suitable number of viewing windows 61 may be provided in the external wall 39 so that the inside level of the juice may be seen from the exterior of the apparatus. A probe 63 may also extend through the wall 39 for a purpose which will be readily understood by those skilled in this art.

A hot waste combustion gas orienting means which I have designated generally by the numeral 65 is provided. This orienting means 65 is disposed in the apparatus so that the hot combustion gases will flow therethrough while being properly oriented and into the lower generally bell shaped area 31 of the heat transmitting area. The orienting means comprises a pair of vertically spaced apart circular plates or calandrias 67, the diameter of these plates being substantially equal to the diameter of the lowest part of the bell shaped area 31. The orienting means also consists of an imperforate annulus 69 which is of a width substanitally equal to the distance between the spaced plates 67. The rim of the upper plate 67 rests on the annulus 69 and an annular foot 71 is provided on the bell shaped wall 27 and this rests on the annulus 69. The lower plate 67 rests on the bottom 59 of the evaporating area which in turn rests upon the inwardly directed lip or flange 17 of the collar 15. Each plate 67 is provided with a multiplicity of openings 73 therein, the remainder of each plate being solid or imperforate. Fixed in any suitable manner in each of these openings 73 is a heat conducting tube 75 and each such tube 75 is open ended and it extends from the upper plate to the lower plate and is adapted to feed hot waste combustion gas from the area 9 to the bell shaped area 31.

Each plate 67 is formed with a central opening 77 therein in which a tube 79 is provided and it will be clear from consideration of the drawings that the openings 77 and the tube 79 are of greater diameter than the openings 73 in the plates 67 and the tubes 75.

When this apparatus is in operation, the liquid cane or other juice is pumped into the bottom portion of the area 43 through the inlet pipes 45 and 47, it being understood, of course, that hot waste combustion gases are flowing through the orienting means 65 into the heat transmitting area composed of the areas 29, 31 and 33. It is to be distinctly understood that one inlet feed line may be employed and also that more than two feed lines may be employed and such arrangement will fall within the spirit and scope of this invention. The body of juice in the lower portion of the area 43, I have designated by the numeral 81 and since this body of juice 81 is under pressure it will move upwardly in the evaporating area 43, the approximate level being indicated at 83. The evaporation or dehydration of juice will occur throughout the area 43 above the body of juice and this dehydrated juice under the influence of the pressured body of juice will be forced upwardly in the area 43 and will flow through an outlet line 85 to a second body or to a condenser.

What is claimed is:

1. An evaporating apparatus including in combination, a source of hot waste gases, a heat transmitting area, a hot gas orienting means positioned between said source of hot waste gases and said heat transmitting area, said hot gases flowing through said orienting means and into said transmitting area, an evaporating area in heat transfer relationship with said transmitting area, and said heat transmitting area includes a lower generally bell shaped area, an upper generally inverted bell shaped area spaced from said lower bell shaped area and a central diametrically constricted area connecting said two first named areas, and the wall of said heat transmitting area being spaced from the outer wall of said evaporating area and the outer wall of said evaporating area conforming generally to the configuration of the upper generally inverted bell shaped area, and the width of the upper portion of the evaporating area adjacent to the constricted area and of the lower bell shaped area of the heat transmitting area.

* * * * *